(12) United States Patent
Mueller

(10) Patent No.: US 9,114,466 B2
(45) Date of Patent: Aug. 25, 2015

(54) METHOD FOR MACHINING A WORKPIECE WITH A WORM-SHAPED CUTTING TOOL

(71) Applicants: KAPP GmbH, Coburg (DE); NILES WSerkzeugmaschinen GmbH, Berlin (DE)

(72) Inventor: Frank Mueller, Meeder (DE)

(73) Assignees: KAPP GMBH, Coburg (DE); NILES WERKZEUGMASCHINEN GMBH, Berlin (DE)

( * ) Notice: Subject to any disclaimer, the term of this patent is extended or adjusted under 35 U.S.C. 154(b) by 268 days.

(21) Appl. No.: 13/795,366

(22) Filed: Mar. 12, 2013

(65) Prior Publication Data

US 2013/0244546 A1 Sep. 19, 2013

(30) Foreign Application Priority Data

Mar. 15, 2012 (DE) .......................... 10 2012 005 228

(51) Int. Cl.
*B23F 11/00* (2006.01)
*B23F 5/04* (2006.01)
*B23F 5/22* (2006.01)

(52) U.S. Cl.
CPC ... *B23F 5/04* (2013.01); *B23F 5/22* (2013.01); *B23F 11/00* (2013.01)

(58) Field of Classification Search
CPC ........... B23F 11/00; Y10T 409/101749; Y10T 409/107473; Y10T 74/19953
See application file for complete search history.

(56) References Cited

U.S. PATENT DOCUMENTS

| 1,797,461 | A | * | 3/1931 | Wildhaber | 451/47 |
| 2,006,750 | A | * | 7/1935 | Shlesinger | 451/47 |
| 2,164,978 | A | * | 7/1939 | Wildhaber | 451/47 |
| 3,060,643 | A | * | 10/1962 | Wildhaber | 451/47 |
| 3,897,661 | A | * | 8/1975 | Inatomi et al. | 451/47 |
| 8,113,915 | B2 | * | 2/2012 | Jankowski et al. | 451/47 |

FOREIGN PATENT DOCUMENTS

| DE | 7287 A | 7/1954 |
| DE | 33 14793 A1 | 11/1983 |
| EP | 1 987 919 A2 | 11/2008 |

* cited by examiner

*Primary Examiner* — Maurina Rachuba
(74) *Attorney, Agent, or Firm* — Lucas & Mercanti, LLP

(57) ABSTRACT

The invention relates to a method for machining a workpiece, preferably of a gear, with a multiple thread worm-shaped cutting tool with several parallel running helical and ridge-shaped cutting edges. To obtain a higher quality of the machining operation the invention proposes the following steps for the method: a) Bringing the cutting tool with the workpiece into mesh by inserting of a first helical cutting edge of the cutting tool in a first gap of the workpiece which has to be machined or has to be produced and machining of the workpiece with the cutting tool in this contact situation; b) Bringing the cutting tool and the workpiece out of mesh; c) Bringing the cutting tool with the workpiece again into mesh by inserting of the first helical cutting edge of the cutting tool in a second gap of the workpiece which is different from the first gap and machining of the workpiece with the cutting tool.

12 Claims, 3 Drawing Sheets

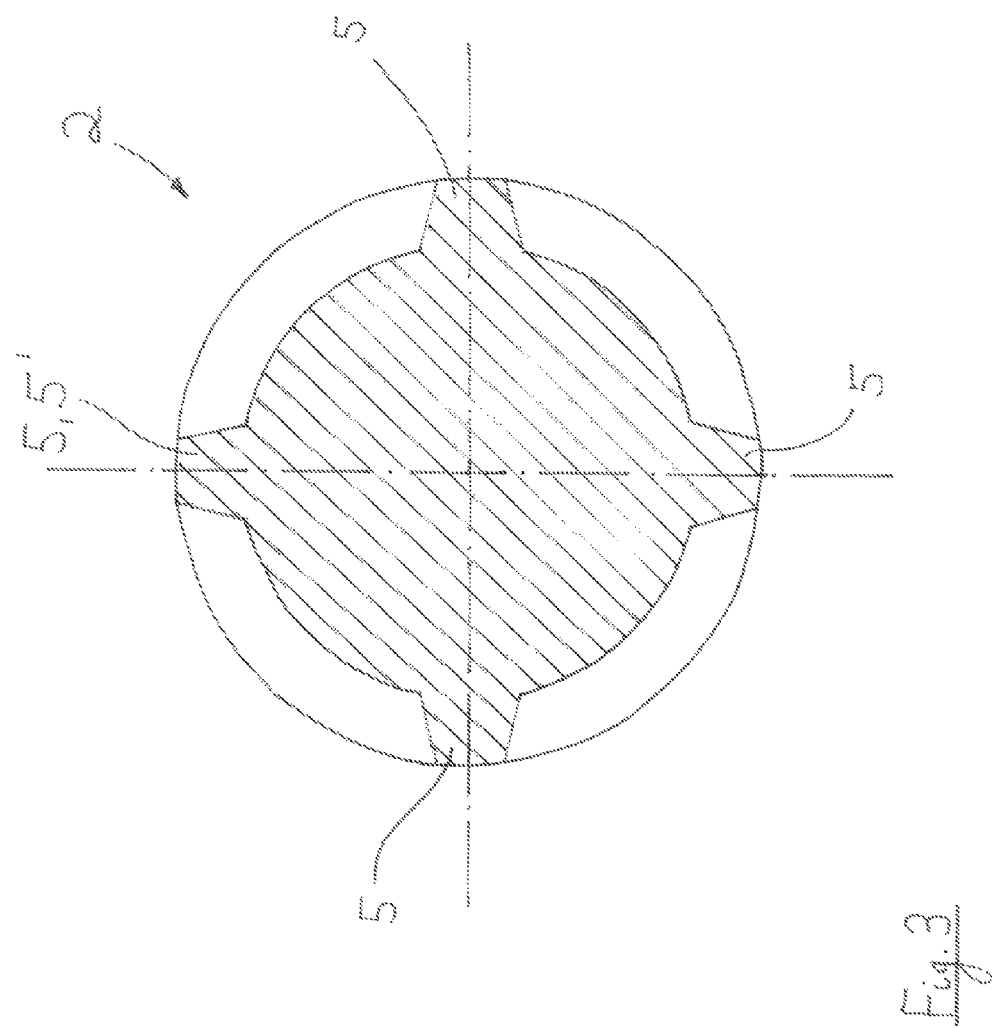

METHOD FOR MACHINING A WORKPIECE WITH A WORM-SHAPED CUTTING TOOL

CROSS-REFERENCE TO RELATED APPLICATIONS

Figure 1:
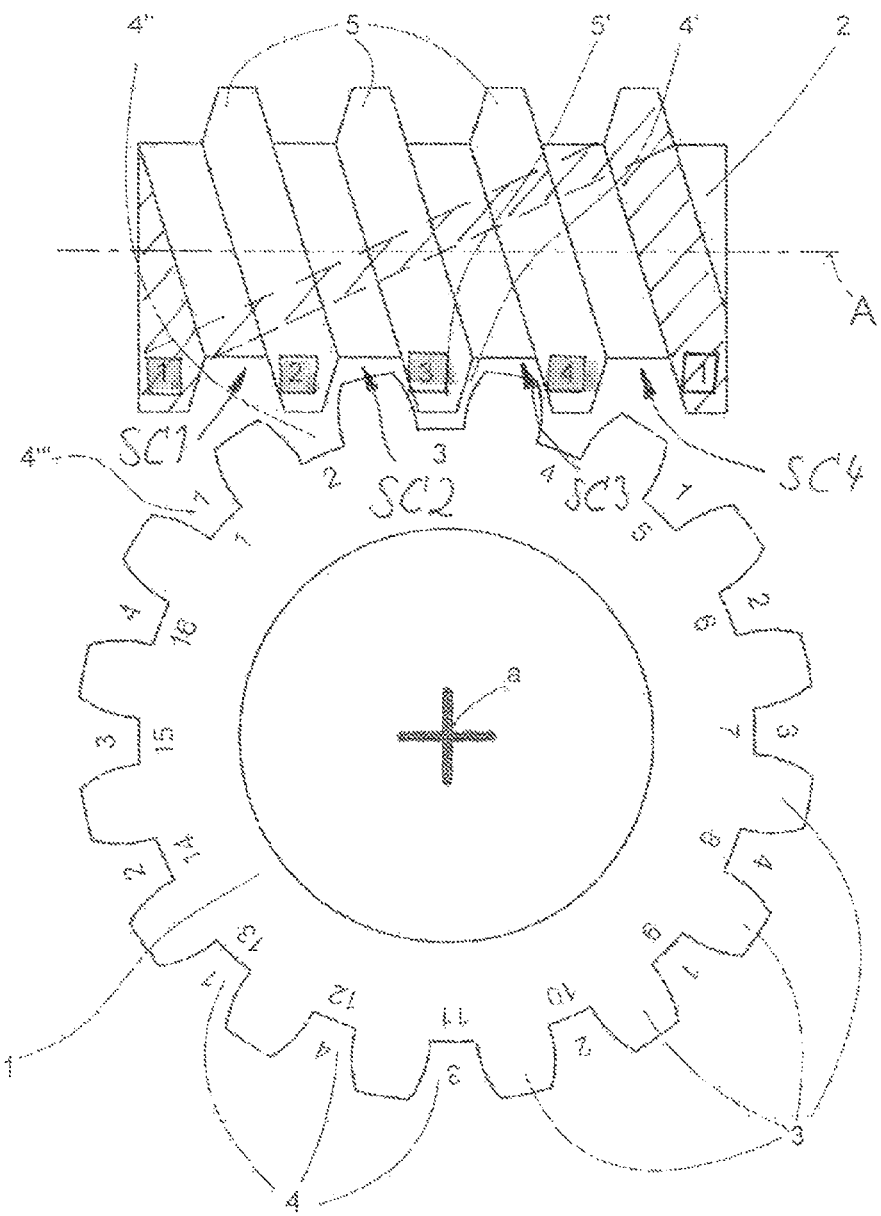

This application claims the priority of DE 10 2012 005 228.6 filed Mar. 15, 2012, the priority of which is hereby claimed and is incorporated by reference herein.

The invention relates to a method for machining a workpiece with a worm-shaped cutting tool, wherein the workpiece has an axis and has a profile around its circumference or is provided with a profile, wherein the profile has a number of radially extending protrusions (teeth), so that between two protrusions a respective number of gaps is given which have to be machined or have to be produced, wherein the worm-shaped cutting tool has an axis and comprises a number of screw channels, which run spiral-shaped around the axis and parallel to another, so that several parallel running helical and ridge-shaped cutting edges result.

Preferably the invention refers to a method of grinding a workpiece with a worm-shaped grinding tool (grinding worm). But the invention can also be applied at hobbing.

Thereby it is preferably thought of grinding of a pre-geared gear or of a similar workpiece, wherein however also a grinding is possible from the solid. The last mentioned method is herewith interesting especially with small modules or with prototypes.

At hard finishing, particularly of gears, the grinding with a grinding worm is well known in the state of the art. It is referred to EP 1 987 919 A2 in an exemplarily way, where a grinding worm is described to the mentioned purpose. Also DE 33 14 793 A1 discloses the grinding with a grinding worm. In DD 7287 A a grinding wheel package is used for the grinding of a gear.

Herewith a continuous grinding process takes place (in contrast to the discontinuous grinding of the individual tooth gap of the gear which has to be grinded), wherein the multiple thread grinding worm meshes with the gear which has to be grinded and the gear and the grinding worm rotate relatively to another in a correlating manner with the appropriate infeed.

At the machining of gearings (or similar profiles) with a grinding worm (i. e. with a tool which carries out a generative forming process) the number of threads of the tool is preferably chosen so, that the workpiece teeth number divided through the tool teeth number (i.e. thread number) is not integer.

The reason for that is, that it shall be avoided herewith, that failures in the tool transfer systematically onto the workpiece. This happens that is to say, if the mentioned proportion is integer, because then a particular tooth of the tool (i. e. a particular spiral-shaped running cutting edge of the grinding worm) meshes over and over again into the same tooth gap of the workpiece.

Due to this reason such mating of a workpiece and a tool (grinding worm) will be avoided in praxis. This however accompanies adversely in such a way, that the number of the required and therefore providable tools rises and an increasing expenditure for setting-up is given due to permanent change of tools. Both increase costs and reduce the profitability of the grinding process.

Thus, it is an object of the invention to improve a method for machining a workpiece of the generic type, particularly for grinding of a gear or of a workpiece which is similar to a gear by a multiple thread cutting tool, particularly by a grinding worm, so that a higher quality of the machining will be possible, which shall be the case in particular also then, when adversely proportions result between the geometry of the gear and the cutting tool (integer proportion between the number of the teeth and the number of the threads of the cutting tool). Herewith a particular high exactness of the pitch will be aimed. Thereby it shall be made possible to hold the requirement of different tools as small as possible, to profit insofar in corresponding efficient advantages. Finally, a frequent change of tools should be avoided due to the above mentioned reason.

The solution of this object by the invention is in a method for machining a gear or a workpiece which is similar to a gear (profile) with a multiple thread tool characterized in that the method comprises the steps:

a) Bringing the cutting tool with the workpiece into mesh by inserting of a first helical cutting edge of the cutting tool in a first gap of the workpiece which has to be machined or has to be produced and machining of the workpiece with the cutting tool in this contact situation;

b) Bringing the cutting tool and the workpiece out of mesh;

c) Bringing the cutting tool with the workpiece again into mesh by inserting of the first helical cutting edge of the cutting tool in a second gap of the workpiece which is different from the first gap and machining of the workpiece with the cutting tool.

Insofar, the proposed method comprises any machining process like hobbing or generative grinding. Also, the invention proposal comprises the machining of pre-geared or pre-profiled workpieces, but also the machining of the profile or gearing into the solid.

In the specific case of generative grinding of a pre-geared gear or similar workpiece the method thus comprises the steps:

a) Bringing the grinding tool with the workpiece into mesh by inserting of a first helical cutting edge of the grinding tool in a first gap of the workpiece which has to be machined and machining of the workpiece with the grinding tool in this contact situation;

b) Bringing the grinding tool and the workpiece out of mesh;

c) Bringing the grinding tool with the workpiece again into mesh by inserting of the first helical cutting edge of the grinding tool in a second gap of the workpiece which is different from the first gap and machining of the workpiece with the grinding tool.

After mentioned step c) the steps b) and c) can be repeated, wherein a renewed meshing of the cutting tool (especially grinding tool) with the workpiece takes place by inserting of the first helical cutting edge of the cutting tool (especially grinding tool) in a further gap of the workpiece which is different from the first and the second gap of the workpiece.

During mentioned step c) preferably the gap is chosen which follows directly in circumferential direction of the workpiece after the first gap. But this is not mandatory. It can also be divided by more than one gap.

The number of radially extending protrusions (i. e. of the teeth in the case of a gear) and the number of screw channels of the worm-shaped cutting tool form preferably a whole-number quotient.

During the machining, especially during the grinding, according to above mentioned step a) preferably at least 75% of the total material which is to be cleared in the gaps, i. e. especially from the stock to be ground, will be removed and ground respectively; preferably the value is 90% of the total material which is to be cleared in the gaps, i. e. especially from the stock to be ground. During the machining according to step c) preferably no further radial infeed between the workpiece and the cutting tool takes then place any more, which exceeds the radial infeed between the workpiece and the cutting tool, which has already been chosen according to step a).

The workpiece is preferably a gear, the mentioned protrusion are in this case the teeth of the gear. The gear has thereby preferably an external tooth system.

But it is also possible, that the workpiece is a rotor with an external profile.

The proposed method and the proposed grinding worm respectively can be employed in general for hard finishing of gears and special profiles (like e. g. rotors or cycloids).

Thus, the machining, particularly the grinding, thereby takes place with at least two (grinding) cuts, wherein it is not compulsive, that at the second (grinding) cut a further specific infeed takes place to remove stock from the flank of the gear or profile.

Dressable and dressing-free grinding worms can be used (i. e. grinding worms with a steel base body and a coating with hard material).

The suggested method makes it possible, to disclaim and at least to reduce respectively a high storage of different cutting tools, in particular grinding tools, because it will be possible, to achieve also very good machining results, when cutting tools and grinding worms respectively are used for the machining of workpieces, although the quotient of the number of teeth of the workpiece and the number of threads of the tool is integer.

Accordingly a high quality can be achieved at the mentioned integer quotient between the number of teeth and the number of threads, particularly in consideration of the pitch.

Thus, the suggested method provides that after every machining step outside of the mesh between the cutting tool and the workpiece the workpiece and the tool respectively will be rotated around one or several partitions (teeth), so that at the next machining step other cutting tools edges mesh with the gaps which have to be machined. Thus, shortcomings of the cutting tool can't be copied systematically to a specific tooth gap.

In the drawings an embodiment of the invention is shown. It shows

Figure 2:
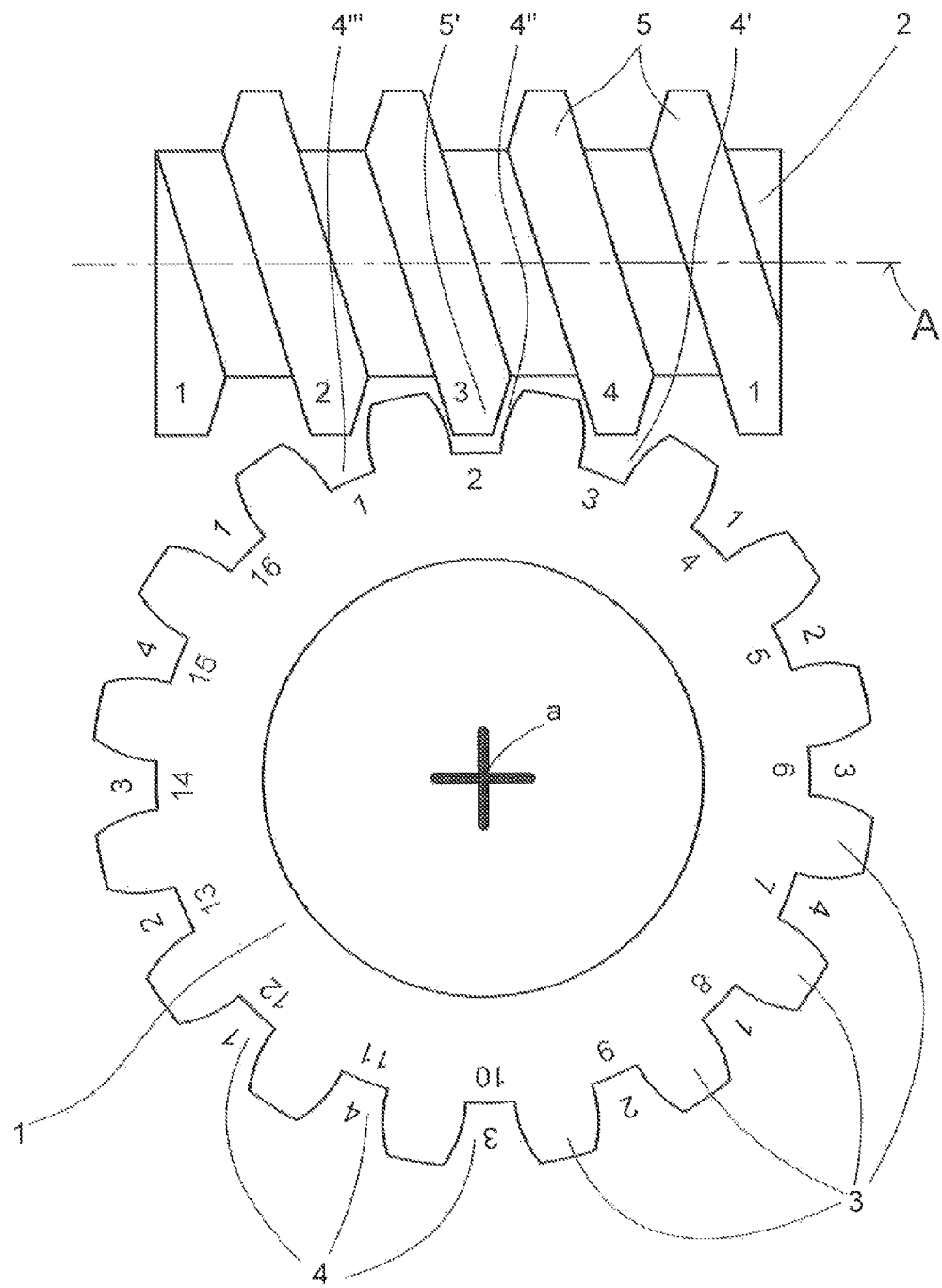

FIG. 1 schematically a gear—seen in axial direction—and a grinding worm by which the gear is ground during a first step of the grinding process;

FIG. 2 in the depiction of FIG. 1 a second step of the grinding process; and

FIG. 3 is a cross-sectional view of the grinding worm.

In the figures a workpiece 1 in form of a gear is shown. The gear has a number of radial protrusions 3, thus teeth, which are arranged along the outer circumference of the gear body which is basically cylindrical. Between two teeth 3 there is a tooth gap 4 that—which is not visible—comprises a tooth stock, which is ground by a grinding process, so that the gear 1 receives its end contour. The axis of rotation of the gear 1 is marked with a. The number of the teeth 3 and therefore also the number of the gaps 4 is z.

The grinding process is carried out by bringing a grinding tool 2 in form of a grinding worm into mesh with the gear 1. The grinding worm has an axis of rotation A, around which it rotates during the grinding process. The gear grinding with grinding worms is known sufficiently, so that it is not necessary to go further into that subject; it is referred to the above mentioned state of the art.

The grinding worm 2 is designed multiple threaded, i. e. around the axis A of the worm-shaped grinding tool 2 a number g of spiral-shaped running screw channels extend; the individual screw channels run parallel to another. According to that several parallel running helical and ridge-shaped cutting edges 5 will be built. The grinding worm 2 has four threads in the present case, i. e. four screw channels run spiral-shaped parallel next to each other around the axis of rotation A.

Is the ratio of the number of the teeth z to the number of threads g in whole numbers, it results, as described above, in a negative way, that always the same cutting edge 5 of the grinding worm ends up in a specific gap 4; therefore the defects of the tool will be transmitted systematically and undesirably upon the workpiece. To avoid that, the following will be done.

In the embodiment the gear has 16 teeth 3 and gaps 4 respectively which have to been ground. The number of the teeth and gaps respectively z is thus 16. The gaps are numbered in the radial inner region of the gear 1 from 1 to 16.

The grinding worm 2 is designed four-threaded, so that four cutting edges 5 (bars or ridges which are spiral shaped and radially protruding from the worm base body) are at hand. FIG. 3 illustrates a cross-sectional view of worm 2 with four cutting edges 5. The number of the channels g of the grinding worm 2 so thus 4. The cutting edges 5 are numbered on the tool 2 with 1 to 4.

The quotient z/g is therefore 16/4=4, i. e, it is integer.

In a first step of the method of the grinding process a bringing into mesh of the grinding tool 2 with the workpiece 1 occurs by insertion of a first spiral-shaped running cutting edge 5' of the grinding tool 2 into a first gap 4' of the workpiece 1 which has to be ground; in this situation of mesh the workpiece 1 will be ground, wherein already an essential part of the stock which has to be removed (or the whole stock) will be ground.

This is illustrated in FIG. 1. It is shown, that the cutting edge 5' of the grinding worm 2 (named with cutting edge no. 3) will be brought into mesh within the gap 4' of the gear 1 (named with gap no. 3).

Accordingly the mentioned cutting edge 5' (=cutting edge no. 3) comes then also with the gaps no. 7, no. 11 and no. 15 and then again with no. 3 into mesh, as long as the mentioned method step of the grinding process persists, which results out of the integer quotient z/g=4. This is named by numbers in the radial outer region within the gaps of the gear 1.

As it results of the numbering of the cutting edges 5 of the tool 2—from no. 1 to no. 4—the same cutting edges come also into mesh in the other gaps 4.

So the cutting edge no. 1 attains always with the gaps no. 1, no. 5, no. 9 and no. 13 into mesh.

However the cutting edge no. 2 comes always into mesh with the gaps no. 2, no. 6, no. 10 and no. 14.

Finally the cutting edge no. 4 attains always into mesh with the gaps no. 4, no. 8, no. 12 and no. 16.

So that, as the case may be, the shortcomings of the grinding tool won't be transmitted systematically upon the tool, the grinding will be stopped and the grinding tool 2 and the gear 1 will be brought out of mesh, after the performance of the mentioned first method step of the grinding process.

The gear will now be rotated around a gap, i. e. around a partition, and the mesh between the workpiece and the tool will be restored. This is shown in FIG. 2. The grinding process will be continued. The mesh situation is now changed as following:

Cutting edge no. 3 of the tool 2 grinds now the gaps no. 2, no. 6, no. 10 and no. 14.

Cutting edge no. 1 of the tool 2 grinds now the gaps no. 4, no. 8, no. 12 and no. 16.

Cutting edge no. 2 of the tool 2 grinds now the gaps no. 1, no. 5, no. 9 and no. 13.

Cutting edge no. 4 of the tool 2 grinds now the gaps no. 3, no. 7, no. 11 and no. 15.

For this it will be referred again to the numbering of the cutting edges 5 (no. 1 to 4) and the gaps 4 (no. 1 to 16, s. radial inner numbers on the gear 1), as well as to the numbering of the individual gaps 4, wherein the numbers of the cutting edge 5 is denoted, which gets into the gaps (denoted in the radial outer region of the gear 1).

In general, after the first step of the grinding, the grinding will be proceeded with a new mesh situation, wherein an insertion of the first spiral-shaped running cutting edge 5' of the grinding tool 2 takes place into a second gap 4" of the workpiece 1, which is different from the first gap 4'.

At relevant measurements it was observed, that after the first part of the grinding process the pitch on the right and on the left flank and in the concentricity shows distinct deviations from the form how it should be.

However, after the procedure of the second part of the grinding process the result of the grinding process has improved essentially. Thereby a very positive result can be expected, when the second part of the process takes place only with a small or even with no further infeed (radial infeed between tool and workpiece). Insofar it has itself proven, that during the first part of the grinding process the stock which has to be removed will be ground largely and after the mentioned partition by (at least) one gap during the second part of the grinding process is carried out without further infeed.

LIST OF REFERENCES

1 Workpiece (Gear)
2 Worm-shaped cutting tool (grinding worm)
3 Protrusion (tooth)
4 Gap
4' Gap
4" Gap
4'" Gap
5 Cutting edge
5' Cutting edge
a Axis of the workpiece
A Axis of the cutting tool
z Number of the protrusions/gaps (teeth)
g Number of the screw channels

The invention claimed is:

1. Method for machining a workpiece with a worm-shaped cutting tool,
wherein the workpiece has an axis (a) and has a profile around its circumference or is provided with a profile,
wherein the profile has a number (z) of radially extending protrusions, so that between two protrusions a respective number (z) of gaps is given which have to be machined or have to be produced,
wherein the worm-shaped cutting tool has an axis (A) and comprises a number (g) of screw channels, which run spiral-shaped around the axis (A) and parallel to another, so that several parallel running helical and ridge-shaped cutting edges result,
wherein
the method comprises the steps:
a) Bringing the cutting tool with the workpiece into mesh by inserting of a first helical cutting edge of the cutting tool in a first gap of the workpiece which has to be machined or has to be produced and machining of the workpiece with the cutting tool in this contact situation;
b) Bringing the cutting tool and the workpiece out of mesh;
c) Bringing the cutting tool with the workpiece again into mesh by inserting of the first helical cutting edge of the cutting tool in a second gap of the workpiece which is different from the first gap and machining of the workpiece with the cutting tool.

2. Method according to claim 1, wherein after step c) of claim 1 the steps b) and c) of claim 1 are repeated, wherein a renewed meshing of the cutting tool with the workpiece takes place by inserting of the first helical cutting edge of the cutting tool in a further gap of the workpiece which is different from the first and the second gap of the workpiece.

3. Method according to claim 1 wherein in step c) of claim 1 the gap is chosen which follows directly in circumferential direction of the workpiece after the first gap.

4. Method according to claim 1, wherein the number (z) of radially extending protrusions and the number (g) of screw channels of the worm-shaped cutting tool form a whole-number quotient.

5. Method according to claim 1, wherein during the machining according to step a) of claim 1 at least 75%, of the total material which is to be cleared in the gaps is removed.

6. Method according to claim 5, wherein during the machining according to step c) of claim 1 no further radial infeed between the workpiece and the cutting tool takes place, which go over the radial infeed between the workpiece and the cutting tool, which has been chosen according to step a) of claim 1.

7. Method according to claim 1, wherein the workpiece is a gear and the protrusion are the teeth of the gear.

8. Method according to claim 7, wherein the gear has an external tooth system.

9. Method according to claim 1, wherein the workpiece is a rotor with an external profile.

10. Method according to claim 1, wherein the process of the machining is a grinding process and a grinding worm is used as the cutting tool.

11. Method according to claim 5, wherein at least 90% of the total material which is to be cleared in the gaps is removed.

12. Method according to claim 11 wherein during the machining according to step c) of claim 1 no further radial infeed between the workpiece and the cutting tool takes place, which go over the radial infeed between the workpiece and the cutting tool, which has been chosen according to step a) of claim 1.

* * * * *